United States Patent
Kirby et al.

(10) Patent No.: US 10,392,947 B2
(45) Date of Patent: Aug. 27, 2019

(54) COMPOSITIONS AND METHODS OF ATTACHMENT OF THICK ENVIRONMENTAL BARRIER COATINGS ON CMC COMPONENTS

(71) Applicant: General Electric Company, Schenectady, NY (US)

(72) Inventors: Glen Harold Kirby, Liberty Township, OH (US); Nicholas Edward Antolino, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 1055 days.

(21) Appl. No.: 14/797,235

(22) Filed: Jul. 13, 2015

(65) Prior Publication Data

US 2017/0016335 A1    Jan. 19, 2017

(51) Int. Cl.
*B23B 7/04* (2006.01)
*F01D 5/28* (2006.01)
(Continued)

(52) U.S. Cl.
CPC ............... *F01D 5/288* (2013.01); *B32B 7/04* (2013.01); *B32B 18/00* (2013.01); *B32B 37/06* (2013.01); *C04B 35/71* (2013.01); *C04B 41/009* (2013.01); *C04B 41/5024* (2013.01); *C04B 41/52* (2013.01); *C04B 41/524* (2013.01); *C04B 41/87* (2013.01); *C04B 41/89* (2013.01); *F01D 5/147* (2013.01); *F01D 5/284* (2013.01);
(Continued)

(58) Field of Classification Search
CPC ........ F01D 5/288; F01D 5/147; F01D 25/005; B32B 7/04; B32B 37/06; B32B 18/00; B32B 2264/10; B32B 2264/12; B32B 2315/00; B32B 2603/00; C04B 35/71; C04B 41/87; C04B 41/52; C04B 41/524; C04B 41/5024; C04B 41/009; C04B 2235/3427; F05D 2220/32; F05D 2230/90; F05D 2300/6033; F05D 2300/611
See application file for complete search history.

(56) References Cited

U.S. PATENT DOCUMENTS 6,234,755 B1    5/2001  Bunker et al.
6,299,988 B1   10/2001  Wang et al.
(Continued)

FOREIGN PATENT DOCUMENTS

WO   WO 2013/188645 A2   12/2013

*Primary Examiner* — Jonathan C Langman
(74) *Attorney, Agent, or Firm* — General Electric Company; Kristi Davidson

(57) ABSTRACT

A coating system on a CMC substrate is provided, along with methods of its tape deposition onto a substrate. The coating system can include a bond coat on a surface of the CMC substrate; a first rare earth silicate coating on the bond coat; a first sacrificial coating of a first reinforced rare earth silicate matrix on the at least one rare earth silicate layer; a second rare earth silicate coating on the sacrificial coating; a second sacrificial coating of a second reinforced rare earth silicate matrix on the second rare earth silicate coating; a third rare earth silicate coating on the second sacrificial coating; and an outer layer on the third rare earth silicate coating. The first sacrificial coating and the second sacrificial coating have, independently, a thickness of about 4 mils to about 40 mils.

12 Claims, 3 Drawing Sheets

(51) Int. Cl.
  *C04B 41/89* (2006.01)
  *C04B 41/00* (2006.01)
  *C04B 41/52* (2006.01)
  *B32B 7/04* (2019.01)
  *B32B 18/00* (2006.01)
  *B32B 37/06* (2006.01)
  *C04B 35/71* (2006.01)
  *C04B 41/50* (2006.01)
  *C04B 41/87* (2006.01)
  *F01D 5/14* (2006.01)
  *F01D 25/00* (2006.01)
  *F01D 11/12* (2006.01)

(52) U.S. Cl.
  CPC .......... *F01D 11/122* (2013.01); *F01D 11/125* (2013.01); *F01D 25/005* (2013.01); *B32B 2264/10* (2013.01); *B32B 2264/12* (2013.01); *B32B 2315/00* (2013.01); *B32B 2603/00* (2013.01); *C04B 2235/3427* (2013.01); *F05D 2220/32* (2013.01); *F05D 2230/22* (2013.01); *F05D 2230/90* (2013.01); *F05D 2260/95* (2013.01); *F05D 2300/6033* (2013.01); *F05D 2300/611* (2013.01); *Y02T 50/671* (2013.01)

(56) References Cited

U.S. PATENT DOCUMENTS

| | | |
|---|---|---|
| 6,383,602 B1 | 5/2002 | Fric et al. |
| 7,997,867 B1 | 8/2011 | Shih et al. |
| 8,057,179 B1 | 11/2011 | Liang |
| 8,057,181 B1 | 11/2011 | Liang |
| 8,727,730 B2 * | 5/2014 | Liotta ................ F01D 5/282 416/193 A |
| 2004/0118122 A1 | 6/2004 | Mitchell et al. |
| 2005/0135931 A1 | 6/2005 | Nakamata et al. |
| 2005/0286998 A1 | 12/2005 | Lee et al. |
| 2006/0154093 A1 * | 7/2006 | Meschter ............ C04B 41/009 428/469 |
| 2006/0280953 A1 * | 12/2006 | Hazel ................ C04B 35/16 428/446 |
| 2008/0286090 A1 | 11/2008 | Okita |
| 2010/0080984 A1 * | 4/2010 | Lee ................ C04B 35/16 428/334 |
| 2011/0027578 A1 * | 2/2011 | Kirby ................ C04B 41/009 428/336 |
| 2011/0052925 A1 | 3/2011 | Sarrafi-Nour et al. |
| 2011/0097191 A1 | 4/2011 | Bunker |
| 2011/0203281 A1 | 8/2011 | Sarrafi-Nour et al. |
| 2011/0271684 A1 | 11/2011 | Corsmeier et al. |
| 2011/0293423 A1 | 12/2011 | Bunker et al. |
| 2011/0305583 A1 | 12/2011 | Lee et al. |
| 2012/0111015 A1 | 5/2012 | Bunker |
| 2012/0163986 A1 | 6/2012 | Darkins, Jr. et al. |
| 2012/0167633 A1 | 7/2012 | Hirayama et al. |
| 2013/0095344 A1 | 4/2013 | Nagaraj et al. |
| 2013/0136915 A1 * | 5/2013 | Naik ................ C04B 41/009 428/312.6 |
| 2013/0175015 A1 | 7/2013 | Tanaka et al. |
| 2013/0205787 A1 | 8/2013 | Zelesky et al. |
| 2013/0205791 A1 | 8/2013 | Mongillo, Jr. et al. |
| 2013/0205792 A1 | 8/2013 | Gleiner et al. |
| 2013/0209229 A1 | 8/2013 | Xu et al. |
| 2013/0209236 A1 | 8/2013 | Xu |
| 2013/0209269 A1 | 8/2013 | Gleiner et al. |
| 2014/0050893 A1 | 2/2014 | Paige et al. |

* cited by examiner

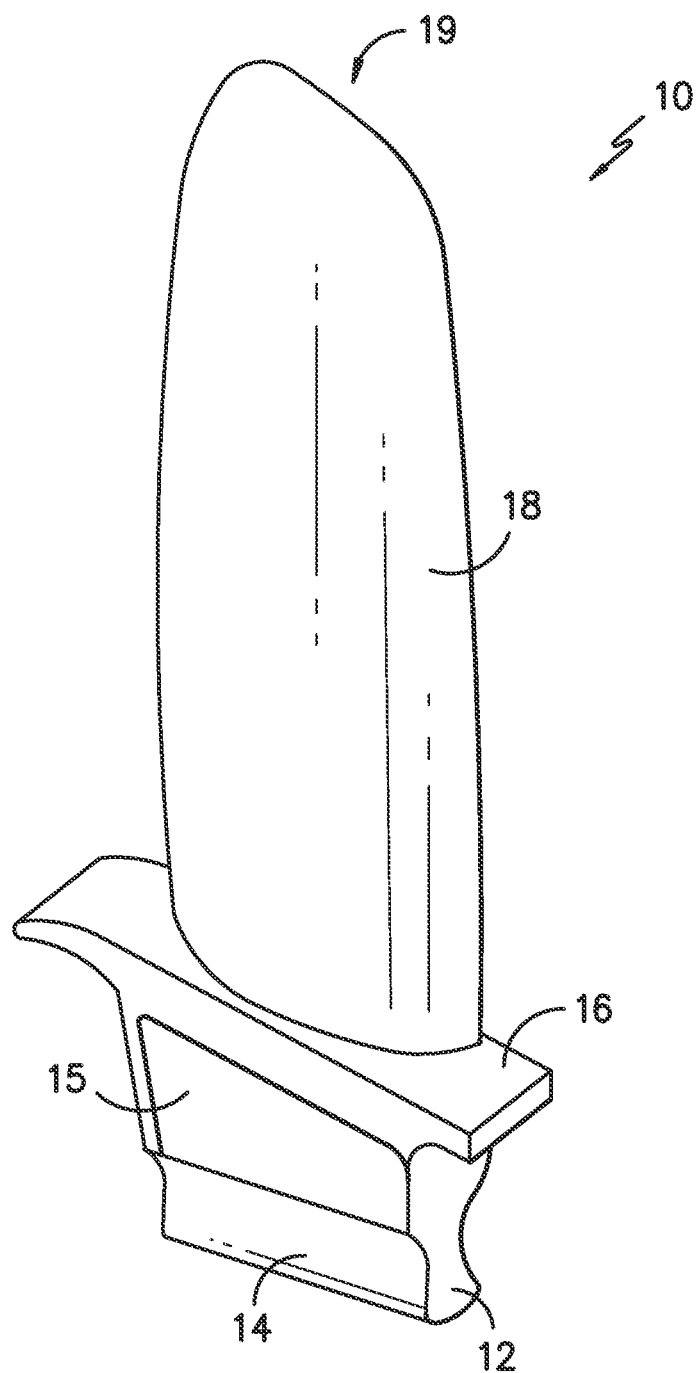
FIG. -1-

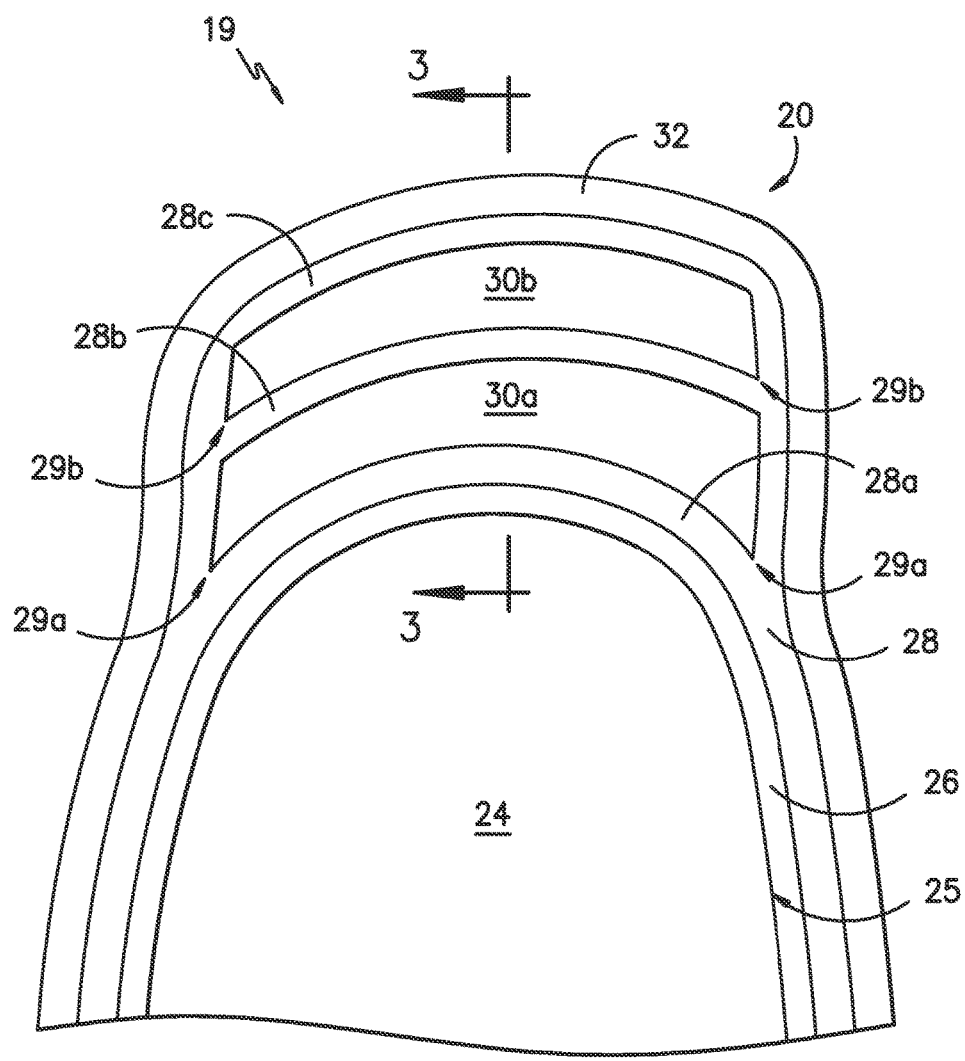
FIG. -2-

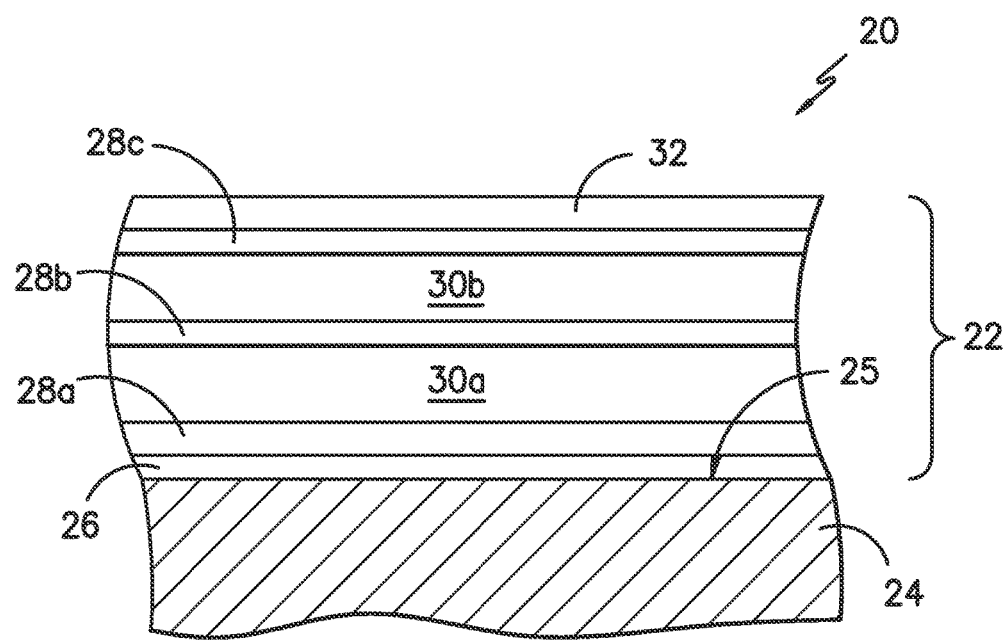
FIG. -3-

COMPOSITIONS AND METHODS OF ATTACHMENT OF THICK ENVIRONMENTAL BARRIER COATINGS ON CMC COMPONENTS

FIELD OF THE INVENTION

The present invention relates generally to gas turbine engines turbines. More specifically, embodiments of the invention generally relate to thick environmental barrier coatings on CMC components, such as CMC blade tips.

BACKGROUND OF THE INVENTION

The turbine section of a gas turbine engine contains a rotor shaft and one or more turbine stages, each having a turbine disk (or rotor) mounted or otherwise carried by the shaft and turbine blades mounted to and radially extending from the periphery of the disk. A turbine assembly typically generates rotating shaft power by expanding hot compressed gas produced by combustion of a fuel. Gas turbine buckets or blades generally have an airfoil shape designed to convert the thermal and kinetic energy of the flow path gases into mechanical rotation of the rotor.

Turbine performance and efficiency may be enhanced by reducing the space between the tip of the rotating blade and the stationary shroud to limit the flow of air over or around the top of the blade that would otherwise bypass the blade. For example, a blade may be configured so that its tip fits close to the shroud during engine operation. Thus, generating and maintaining an efficient tip clearance is particularly desired for efficiency purposes.

Although turbine blades may be made of a number of superalloys (e.g., nickel-based superalloys), ceramic matrix composites (CMCs)) are an attractive alternative to nickel-based superalloys for turbine applications because of their high temperature capability and light weight. However, CMC components must be protected with an environmental barrier coating (EBC) in turbine engine environments to avoid severe oxidation and recession in the presence of high temperature steam.

Thus, in certain components, regions of the EBC may be susceptible to wear due to rub events with adjacent components. For example, for the CMC blade, the EBC at the blade tip is susceptible to rub against metal shroud components. If the EBC coating wears away, the CMC blade is then open to recessive attack from high temperature steam that will open up the clearance between the CMC blade tip and the metal shroud, thereby reducing the efficiency of the engine.

Thus, it is desirable in the art to provide materials and methods for reducing EBC wear on a CMC blade tip caused by a rub event during operation of a turbine.

BRIEF DESCRIPTION OF THE INVENTION

Aspects and advantages of the invention will be set forth in part in the following description, or may be obvious from the description, or may be learned through practice of the invention.

A coating system on a CMC substrate is generally provided, along with methods of its tape deposition onto a substrate. In one embodiment, the coating system includes a first rare earth silicate coating on the substrate (e.g., with a bond coat positioned therebetween); a first sacrificial coating of a first reinforced rare earth silicate matrix on the at least one rare earth silicate layer; a second rare earth silicate coating on the sacrificial coating; a second sacrificial coating of a second reinforced rare earth silicate matrix on the second rare earth silicate coating; a third rare earth silicate coating on the second sacrificial coating; and an outer layer on the third rare earth silicate coating. The first rare earth silicate coating, the second rare earth silicate coating, and the third rare earth silicate coating include, independently, at least one rare earth silicate layer. The first sacrificial coating and the second sacrificial coating have, independently, a thickness of about 4 mils to about 40 mils.

A blade (e.g., a turbine blade) is also generally provided that includes an airfoil having a CMC substrate and defining a blade tip, with at least the blade tip of the airfoil including such a coating system.

In one embodiment, the method of tape deposition of a sacrificial coating on a CMC substrate includes applying a first matrix material onto a surface of a first film; drying the first matrix material to remove the solvent forming a first tape having a film side and a matrix side; applying the first tape onto the CMC substrate with the matrix side facing the CMC substrate; applying a second matrix material onto a surface of a second film applying the second tape onto the CMC substrate with the matrix side facing the CMC substrate; and sintering the first tape and the second tape to bond the first matrix material to the CMC substrate via a first bonding layer and to bond the second matrix material to the first matrix material via a second bonding layer. Generally, the first matrix material and the second matrix material includes, independently, a mixture of a rare earth silicate powder, a sintering aid, and a solvent.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

FIG. 1 is a perspective view schematically representing an exemplary turbine blade of a type formed of CMC materials;

FIG. 2 shows an exemplary coating system positioned on a blade tip of a turbine blade; and FIG. 3 shows a cross-sectional view of the exemplary coating system of FIG. 2 at the blade tip.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth. "Ln" refers to the rare earth elements of scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), or mixtures thereof. In particular embodiments, Ln is selected from the group consisting of neodymium, gadolinium, erbium, yttrium, and mixtures thereof.

A coating for a CMC blade tip is generally provided herein, along with its methods of formation. The coating for the CMC blade tip is relatively thick, dense, and mechanically resistant to spall and rub in turbine engine environments. The coating is deposited via attaching at least two tapes filled with ceramic particles, sintering aids, organic binders, and plasticizers.

The thick, tape-deposited sacrificial coating is generally provided in combination with a plurality of other, thinner layers to form an EBC on a CMC substrate. When applied to a blade tip, the sacrificial coating provides thickness that can rub away upon contact of the blade tip with a shroud. Thus, the sacrifice of this sacrificial coating during rub events serves to protect the underlying layers of the EBC, such as a relatively thin underlayer of bond coat that in turn protects the CMC from oxidation and/or a relatively thin underlayer of rare earth disilicate that in turn protects the CMC from high temperature steam penetration. It should also be noted that the sacrificial coating itself, may also provide some protection against high temperature steam penetration.

In general, this overall coating system can be described as follows, from the CMC surface outward: a bond coat; one or more dense rare earth silicate layer(s); a first thick layer (at least about 8 mils and preferably at least about 15 mils) of rare earth disilicate matrix mixed with a discontinuous phase of barium strontium aluminosilicate (BSAS) or silicon metal particles (referred to herein as a "reinforced rare earth disilicate matrix"); one or more dense rare earth silicate layer(s); a second thick layer (at least about 8 mils and preferably at least about 15 mils) of a reinforced rare earth disilicate matrix, and the option of one or more rare earth silicate outer layer(s). Each of these layers is described in greater detail below with respect to particular embodiments provided herein.

FIG. 1 shows an exemplary turbine blade 10 of a gas turbine engine. The blade 10 is generally represented as being adapted for mounting to a disk or rotor (not shown) within the turbine section of an aircraft gas turbine engine. For this reason, the blade 10 is represented as including a dovetail 12 for anchoring the blade 10 to a turbine disk by interlocking with a complementary dovetail slot formed in the circumference of the disk. As represented in FIG. 1, the interlocking features comprise protrusions referred to as tangs 14 that engage recesses defined by the dovetail slot. The blade 10 is further shown as having a platform 16 that separates an airfoil 18 from a shank 15 on which the dovetail 12 is defined.

The blade 10 includes a blade tip 19 disposed opposite the platform 16. As such, the blade tip 19 generally defines the radially outermost portion of the blade 10 and, thus, may be configured to be positioned adjacent to a stationary shroud (not shown) of the gas turbine engine. As stated above, during use, the blade tip 19 may contact the shroud, causing a rub event between the blade tip 19 and the shroud.

In one particular embodiment, the blade tip 19 may be further equipped with a blade tip shroud (not shown) which, in combination with tip shrouds of adjacent blades within the same stage, defines a band around the blades that is capable of reducing blade vibrations and improving airflow characteristics. By incorporating a seal tooth, blade tip shrouds are further capable of increasing the efficiency of the turbine by reducing combustion gas leakage between the blade tips and a shroud surrounding the blade tips.

Because they are directly subjected to hot combustion gases during operation of the engine, the airfoil 18, platform 16 and blade tip 19 have very demanding material requirements. The platform 16 and blade tip 19 are further critical regions of a turbine blade in that they create the inner and outer flowpath surfaces for the hot gas path within the turbine section. In addition, the platform 16 creates a seal to prevent mixing of the hot combustion gases with lower temperature gases to which the shank 20, its dovetail 12 and the turbine disk are exposed, and the blade tip 19 is subjected to creep due to high strain loads and wear interactions between it and the shroud surrounding the blade tips 19. The dovetail 12 is also a critical region in that it is subjected to wear and high loads resulting from its engagement with a dovetail slot and the high centrifugal loading generated by the blade 10.

Referring to FIGS. 2 and 3, a coating system 20 is shown forming a thick EBC 22 on a CMC substrate 24 that defines the blade tip 19. In the exemplary embodiment shown, a bond coat 26 is positioned on the surface 25 of the CMC substrate 24. A first rare earth silicate coating 28a is on the bond coat 26 and is formed from at least one rare earth silicate layer. A first sacrificial coating 30a of a reinforced rare earth disilicate matrix is positioned on the at least one rare earth silicate layer 28a. The first sacrificial coating 30a has a thickness of about 4 mils to about 40 mils (e.g., about 8 mils to about 25 mils, such as about 16 mils to about 24 mils). A second rare earth silicate coating 28b is on the first sacrificial coating 30a and is formed from at least one rare earth silicate layer. As such, a rare earth silicate coating (collectively 28a, 28b) surrounds the first sacrificial coating 30a at the blade tip 19. A second sacrificial coating 30b of a reinforced rare earth disilicate matrix is positioned on the second rare earth silicate layer 28b. The second sacrificial coating 30b has a thickness of about 4 mils to about 40 mils (e.g., about 8 mils to about 25 mils, such as about 16 mils to about 24 mils). A third rare earth silicate coating 28c is on the second sacrificial coating 30b and is formed from at least one rare earth silicate layer. As such, a rare earth silicate coating (collectively 28b, 28c) surrounds the second sacrificial coating 30b at the blade tip 19. Finally, an outer layer 32 is positioned on the third rare earth silicate coating 28c. Each of these layers is discussed in greater detail below.

Also, it should be noted that more than two sacrificial coatings could be present in the coating system 20, if desired.

As stated, the bond coat 26 is positioned in the CMC substrate 24, and in most embodiments is in direct contact with the CMC surface 25. The bond coating generally provides oxidation protection to the underlying CMC material 24. In one particular embodiment, the bond coat 26 is a silicon bond coat.

The first rare earth silicate coating 28a generally provides hermeticity against high temperature steam. In one embodiment, the first rare earth silicate coating 28a is formed from at least one layer of a slurry-deposited yttrium ytterbium disilicate (YbYDS) layer. Other silicate layers can be present in the first rare earth silicate coating 28a in order to provide hermeticity against high temperature steam, such as YbDS, LuDS, TmDS, LuYDS, TmYDS, etc. (where Lu=Lutetium and Tm=Thulium), although any rare earth disilicate can be utilized.

The first sacrificial coating 30a of a reinforced rare earth silicate matrix is generally formed by tape-depositing at least one BSAS-reinforced rare earth silicate layer to the desired thickness, such as about 4 mils to about 40 mils (e.g., about 8 mils to about 25 mils, such as about 16 mils to about 24 mils). Multiple layers may be utilized to form the first sacrificial coating 30a of the desired thickness. The first sacrificial coating 30a generally provides thickness to the EBC 22 that can be sacrificed in a rub event by the blade tip 19 with another component in the engine (e.g., a vane). The rare earth silicate layers described with respect to the first sacrificial coating 30a may be comprised of rare earth disilicates (e.g., YbYDS), rare earth monosilicates, or mixtures thereof.

The first sacrificial coating 30a is deposited via a thick tape-deposition and sintering process, since it is very difficult to build up a thick coating on the tip of a blade by a thermal spray technique (since edge effects lead to spallation) or by slurry deposition processes (since it would require multiple applications and heat treatments to build appreciable thickness). According to the thick tape-deposition method, the tape is loaded with the matrix material, such as the matrix material similar to that currently used for slurry deposition of rare-earth disilicates. In this embodiment, a mixture of rare earth disilicate powder and sintering aids that promote coating densification at temperatures of about 2300° F. to about 2500° F. (compared to about 2800° F. in the absence of the sintering aids) is utilized. In this method, however, a plurality of coarse particles (e.g., BSAS particles, silicon particles, or a mixture thereof) are also included in the tape so that they are at a level of about 30% to about 65% by volume of the ceramic material, with the balance being the fine rare earth silicate powder and sintering aid. The coarse particles have, in one embodiment, an average particle size of about 5 microns to about 100 microns. The coarse particle addition helps overcome the problem of the slurry process such that one obtains a thick, crack free layer after heat treatment. The use of BSAS or silicon coarse particles, specifically, also helps keep the porosity in the layer low (on the order of about 20% by volume or less, and in some embodiments, as little as about 10% porosity or less). Other coarse particles, such as $ZrO_2$, can result in porosity levels above 20% by volume. The matrix material also contains organic binder (e.g., polyvinyl butyral) and plasticizer (e.g., dibutyl phthalate or dipropylene glycol dibenzoate) so that the tape is flexible and tacky for the attachment to the CMC blade tip surface. The tape is formed from slurry that comprises all of the constituents mentioned above, plus one or more solvents. The slurry can be cast under a doctor blade with a gap set to a controlled thickness, onto a film (e.g., a polymeric film). The solvent is then removed by drying, yielding the tape. In certain embodiments, the drying temperature is about 15° C. to about 50° C., and can be dried at room temperature (e.g., about 20° C. to about 25° C.). Drying can be accomplished for any suitable duration (e.g., about 30 minutes to about 50 hours). Thus, another advantage of the tape approach is that there is no drying process after the tape is attached to the blade tip that result in drying defects that alter the geometry of the thick tip.

The tapes can be transferred to the CMC substrate by any suitable method. For example, the tape can be transferred to the CMC substrate through applying pressure in combination with the tack of the tape or through applying pressure in combination with an elevated temperature, to get the tape to flow a bit into the roughness of the blade tip surface, and the tack of the tape. In either of these methods, the additional application of a solvent to the tape surface can increase its tack. In one particular embodiment, these methods can be utilized with the addition of slurry, such as rare earth disilicate and sintering aids but without the BSAS particles. The addition of the slurry tends to create a robust bond during sintering.

Multiple tape transfers can be performed, in particular embodiments, to build the resulting first sacrificial coating 30a to the desired thickness.

The second rare earth silicate coating 28b also provides hermeticity against high temperature steam. In one embodiment, the second rare earth silicate coating 28b is formed from at least one layer of a slurry-deposited yttrium ytterbium disilicate (YbYDS) layer. Other silicate layers can be present in the second rare earth silicate coating 28b, similar to those described above with respect to the first rare earth silicate coating 28a in order to provide hermeticity against high temperature steam.

In one particular embodiment, the first rare earth silicate coating 28a and the second rare earth silicate coating 28b are substantially identical in terms of composition. Referring to FIG. 2, the first rare earth silicate coating 28a and the second rare earth silicate coating 28b are extensions of the same rare earth silicate coating 28, but for their respective positioning to surround the sacrificial coating 30 at the blade tip 19. As shown, the separation points 29a serve to split the rare earth silicate coating 28 into the first rare earth silicate coating 28a and the second rare earth silicate coating 28b positioned about the first sacrificial coating 30a. In this embodiment, the first sacrificial coating 30a is completely encased within the first rare earth silicate coating 28a and the second rare earth silicate coating 28b in order to form a hermetic seal against high temperature steam. Additionally, the second rare earth silicate coating 28b may provide additional mechanical stability for the underlying first sacrificial coating 30a (e.g., formed from a BSAS-reinforced YbYDS layer).

Both the first rare earth silicate coating 28a and the second rare earth silicate coating 28b can be formed via slurry deposition. In one embodiment, the first rare earth silicate coating 28a is deposited, followed by tape-deposition of the first sacrificial coating 30a in the location desired. Then, the second rare earth silicate coating 28b can be deposited (e.g., via slurry deposition) onto the first sacrificial coating 30a and the exposed first rare earth silicate coating 28a. Where there is no first sacrificial coating 30a present (e.g., on the leading edge, the blade surface, the trailing edge, etc.), the second rare earth silicate coating 28b is merged with the first rare earth silicate coating 28a in order to form a single layer of the rare earth silicate coating 28.

As shown in FIGS. 2 and 3, the second sacrificial coating 30b of a reinforced rare earth silicate matrix is generally formed by tape-depositing at least one BSAS-reinforced rare earth silicate layer to the desired thickness, such as about 4 mils to about 40 mils (e.g., about 8 mils to about 25 mils, such as about 16 mils to about 24 mils). Multiple layers may be utilized to form the second sacrificial coating 30b of the desired thickness. The second sacrificial coating 30b generally provides thickness to the EBC 22 that can be sacrificed in a rub event by the blade tip 19 with another component in the engine (e.g., a vane). The rare earth silicate layers described with respect to the second sacrificial coating 30b may be comprised of rare earth disilicates (e.g., YbYDS), rare earth monosilicates, or mixtures thereof. The second sacrificial coating 30b may be formed by any of the methods discussed above with respect to the first sacrificial coating 30a.

The third rare earth silicate coating 28c provides hermeticity against high temperature steam. In one embodiment, the third rare earth silicate coating 28c is formed from at least one layer of a slurry-deposited yttrium ytterbium disilicate (YbYDS) layer. Other silicate layers can be present in the third rare earth silicate coating 28c, similar to those described above with respect to the first rare earth silicate coating 28a in order to provide hermeticity against high temperature steam.

In one particular embodiment, the second rare earth silicate coating 28b and the third rare earth silicate coating 28c are substantially identical in terms of composition. Referring to FIG. 2, the second rare earth silicate coating 28b and the third rare earth silicate coating 28c are extensions of the same rare earth silicate coating 28, but for their respective positioning to surround the second sacrificial coating 30b at the blade tip 19. As shown, the separation points 29b serve to split the rare earth silicate coating 28 into the second rare earth silicate coating 28b and the third rare earth silicate coating 28c positioned about the second sacrificial coating 30b. In this embodiment, the second sacrificial coating 30b is completely encased within the second rare earth silicate coating 28b and the third rare earth silicate coating 28c in order to form a hermetic seal against high temperature steam. Additionally, the third rare earth silicate coating 28c may provide additional mechanical stability for the underlying second sacrificial coating 30b (e.g., formed from a BSAS-reinforced YbYDS layer).

Like both the first rare earth silicate coating 28a and the second rare earth silicate coating 28b, the third rare earth silicate coating 28c can be formed via slurry deposition. In one embodiment, the second rare earth silicate coating 28b is deposited, followed by tape-deposition of the second sacrificial coating 30b in the location desired. Then, the third rare earth silicate coating 28c can be deposited (e.g., via slurry deposition) onto the second sacrificial coating 30b and the exposed first second earth silicate coating 28b. Where there is no second sacrificial coating 30b present (e.g., on the leading edge, the blade surface, the trailing edge, etc.), the third rare earth silicate coating 28c is merged with the second rare earth silicate coating 28b in order to form a single layer of the rare earth silicate coating 28.

Thus, in one embodiment, each of the first rare earth silicate coating 28a, the second rare earth silicate coating 28b, and the third rare earth silicate coating 28c are made with a substantially identical composition.

Finally, an outer layer 32 is positioned on the third rare earth silicate coating 28c. In one embodiment, the outer layer 32 comprises at least one slurry-deposited yttrium monosilicate (YMS) layer. The outer layer 32 provides protection against steam recession and molten dust. Materials other than rare earth silicates can be utilized within the outer coating, such as rare earth hafnates, rare earth zirconates, rare earth gallates (e.g., monoclinic type, such as $Ln_4Ga_2O_9$), rare earth monotitanate (e.g., $Ln_2TiO_5$), rare earth cerate (e.g., $Ln_2CeO_5$), rare earth germinate (e.g., $Ln_2GeO_5$), or mixtures thereof. However, all of these materials have a relatively high coeffiecient of thermal expansion (CTE) compared to rare earth silicate. Thus, rare earth monosilicate is preferred. Hafnia, rare-earth stabilized hafnia, and rare-earth stabilized zirconia provide protection against steam recession but not CMAS, and also have higher CTE than rare earth monosilicate.

In addition to a thick coating on the blade tip 19, the EBC 20 can be used as an alternate method to obtain a thick EBC coating on other components or areas of a CMC component (e.g., on a shroud, etc.).

While the invention has been described in terms of one or more particular embodiments, it is apparent that other forms could be adopted by one skilled in the art. It is to be understood that the use of "comprising" in conjunction with the coating compositions described herein specifically discloses and includes the embodiments wherein the coating compositions "consist essentially of" the named components (i.e., contain the named components and no other components that significantly adversely affect the basic and novel features disclosed), and embodiments wherein the coating compositions "consist of" the named components (i.e., contain only the named components except for contaminants which are naturally and inevitably present in each of the named components).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed:

1. A coating system on a CMC blade having a blade tip, the coating system comprising:
    a first rare earth silicate coating on the substrate, wherein the first rare earth silicate coating comprises at least one rare earth silicate layer;
    a first sacrificial coating of a first reinforced rare earth silicate matrix on the at least one rare earth silicate layer, wherein the first sacrificial coating has a thickness of about 4 mils to about 40 mils, and wherein the first reinforced rare earth silicate matrix comprises a rare earth silicate matrix with a discontinuous phase of barium strontium aluminosilicate or silicon metal particles;
    a second rare earth silicate coating on the sacrificial coating, wherein the second rare earth silicate coating comprises at least one rare earth silicate layer, and wherein the first rare earth silicate coating and the second rare earth silicate coating surround the first sacrificial coating at the blade tip so as to merge together;

a second sacrificial coating of a second reinforced rare earth silicate matrix on the second rare earth silicate coating, wherein the second sacrificial coating has a thickness of about 8 mils to about 25 mils, and wherein the second reinforced rare earth silicate matrix comprises a rare earth silicate matrix with a discontinuous phase of barium strontium aluminosilicate or silicon metal particles;

a third rare earth silicate coating on the second sacrificial coating, wherein the third rare earth silicate coating comprises at least one rare earth silicate layer, and wherein the second rare earth silicate coating and the third rare earth silicate coating surround the second sacrificial coating at the blade tip so as to merge together; and an outer layer on the third rare earth silicate coating.

2. The coating system of claim 1, wherein the first sacrificial coating has a thickness of about 8 mils to about 25 mils.

3. The coating system of claim 1, wherein the first sacrificial coating has a thickness of about 16 mils to about 24 mils.

4. The coating system of claim 1, wherein the reinforced rare earth silicate matrix of the first sacrificial coating and of the second sacrificial coating comprises a rare earth silicate mixed with a discontinuous phase of barium strontium aluminosilicate.

5. The coating system of claim 1, wherein the reinforced rare earth silicate matrix of the first sacrificial coating and of the second sacrificial coating comprises a rare earth silicate mixed with a discontinuous phase of silicon metal particles.

6. The coating system of claim 1, wherein the reinforced rare earth silicate matrix of the first sacrificial coating and of the second sacrificial coating comprises a rare earth disilicate.

7. The coating system of claim 1, wherein the reinforced rare earth silicate matrix of the first sacrificial coating and of the second sacrificial coating comprises a rare earth monosilicate.

8. The coating system of claim 1, wherein the reinforced rare earth silicate matrix of the first sacrificial coating and of the second sacrificial coating comprises a rare earth disilicate, a rare earth monosilicate, or a mixture of a rare earth monosilicate and a rare earth disilicate.

9. The coating system of claim 1, further comprising:
a bond coat on a surface of the CMC substrate between the CMC substrate and the first rare earth silicate coating, wherein the bond coat is a silicon bond coat.

10. The coating system of claim 1, wherein the first rare earth silicate coating, the second rare earth silicate coating, and the third rare earth silicate coating have a substantially identical composition and are extensions of the same rare earth silicon coating but for their respective positioning to surround the first sacrificial coating between the first rare earth silicate coating and the second rare earth silicate coating and to surround the second sacrificial coating between the second rare earth silicate coating and the third rare earth silicate coating.

11. A blade, comprising:
an airfoil comprising a CMC substrate and defining a blade tip, wherein a blade surface is defined along a leading edge and a trailing edge of the airfoil; wherein the blade tip has the coating system of claim 1 thereon such that the first sacrificial coating and the second sacrificial coating are on the blade tip while the first rare earth silicate coating, the second rare earth silicate coating, and the third rare earth silicate coating form the same rare earth silicon coating on blade surface.

12. The blade as in claim 11, wherein the blade is a turbine blade comprising:
a shank defining a dovetail; and
a platform separating the airfoil from the shank.

* * * * *